(12) United States Patent
Binek et al.

(10) Patent No.: US 11,420,263 B2
(45) Date of Patent: Aug. 23, 2022

(54) ADDITIVE MANUFACTURING COVER GAS SHIELD

(71) Applicant: United Technologies Corporation, Farmington, CT (US)

(72) Inventors: Lawrence Binek, Glastonbury, CT (US); Zachary Ryan Gibbons, New Hartford, CT (US); Jesse R. Boyer, Middletown, CT (US)

(73) Assignee: Raytheon Technologies Corporation, Farmington, CT (US)

(*) Notice: Subject to any disclaimer, the term of this patent is extended or adjusted under 35 U.S.C. 154(b) by 404 days.

(21) Appl. No.: 16/267,816

(22) Filed: Feb. 5, 2019

(65) Prior Publication Data

US 2020/0246871 A1 Aug. 6, 2020

(51) Int. Cl.
| | |
|---|---|
| *B29C 67/00* | (2017.01) |
| *B22F 12/00* | (2021.01) |
| *B33Y 30/00* | (2015.01) |
| *B22F 10/10* | (2021.01) |

(52) U.S. Cl.
CPC ............ *B22F 12/00* (2021.01); *B33Y 30/00* (2014.12); *B22F 10/10* (2021.01)

(58) Field of Classification Search
CPC .......... B22F 10/10; B22F 12/00; B33Y 10/00; B33Y 30/00; B33Y 50/00; B33Y 50/02
See application file for complete search history.

(56) References Cited

U.S. PATENT DOCUMENTS

| | | | |
|---|---|---|---|
| 9,586,290 B2 | 3/2017 | Buller et al. | |
| 2011/0061591 A1* | 3/2011 | Stecker | G05B 19/4099 |
| | | | 118/663 |
| 2014/0302187 A1* | 10/2014 | Pawlikowski | B29C 64/25 |
| | | | 425/174.4 |
| 2016/0052207 A1* | 2/2016 | Bloom | B29C 64/118 |
| | | | 425/3 |
| 2016/0214173 A1 | 7/2016 | Fisser | |
| 2019/0151943 A1* | 5/2019 | Mironets | B33Y 40/00 |

FOREIGN PATENT DOCUMENTS

| | | |
|---|---|---|
| DE | 102010052206 A1 | 5/2012 |
| DE | 102017221909 A1 | 6/2019 |
| FR | 2738779 A1 | 3/1997 |
| WO | 2019110029 A1 | 6/2019 |

OTHER PUBLICATIONS

Extended European Search Report dated Jun. 16, 2020 for EP Application No. 20155678.4.

\* cited by examiner

*Primary Examiner* — Ryan M Ochylski
(74) *Attorney, Agent, or Firm* — Bachman & LaPointe, P.C.

(57) ABSTRACT

A gas shield for an additive manufacturing system includes a bracket and a flexible curtain mounted to the bracket. A method of additively manufacturing includes removably mounting a gas shield to at least partially segregate a powder dispenser and a chamber.

7 Claims, 5 Drawing Sheets

US 11,420,263 B2

ADDITIVE MANUFACTURING COVER GAS SHIELD

BACKGROUND

The present disclosure relates to additive manufacturing and, more particularly, to a shield for Laser Powder Bed Fusion.

Laser Powder Bed Fusion is an additive manufacturing technique in which a laser is utilized to sinter powdered material. The laser may be guided by a 3D model to bind the powdered material and grow a solid structure component.

When constructing the component via Laser Powder Bed Fusion, a cover gas is used to evacuate precipitate/condensate from the build process. Excessive condensate/gas flow may distort the component being additively manufactured through thermal dissipation affects. A distorted additively manufactured part may result in a recoater crash.

SUMMARY

A gas shield for an additive manufacturing system according to one disclosed non-limiting embodiment of the present disclosure includes a bracket and a flexible curtain mounted to the bracket.

A further aspect of the present disclosure includes a multiple of magnets attached to the bracket.

A further aspect of the present disclosure includes that the bracket is flexible.

A further aspect of the present disclosure includes that the flexible curtain is movable.

A further aspect of the present disclosure includes that the flexible curtain comprises a multiple of slats.

An additive manufacturing system according to one disclosed non-limiting embodiment of the present disclosure includes a chamber a powder dispenser adjacent to the chamber and a gas shield to at least partially segregate the powder dispenser and the chamber.

A further aspect of the present disclosure includes that the gas shield is magnetically attached adjacent to the chamber.

A further aspect of the present disclosure includes that the gas shield is located adjacent to the build plate.

A further aspect of the present disclosure includes that the gas shield is flexible.

A further aspect of the present disclosure includes that the gas shield permits passage of the recoater blade.

A method of additively manufacturing according to one disclosed non-limiting embodiment of the present disclosure includes removably mounting a gas shield to at least partially segregate a powder dispenser and a chamber.

A further aspect of the present disclosure includes adjusting the gas shield to be non-linear.

A further aspect of the present disclosure includes adjusting the gas shield with respect to a gas flow.

A further aspect of the present disclosure includes permitting a recoater blade to pass under the gas shield.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
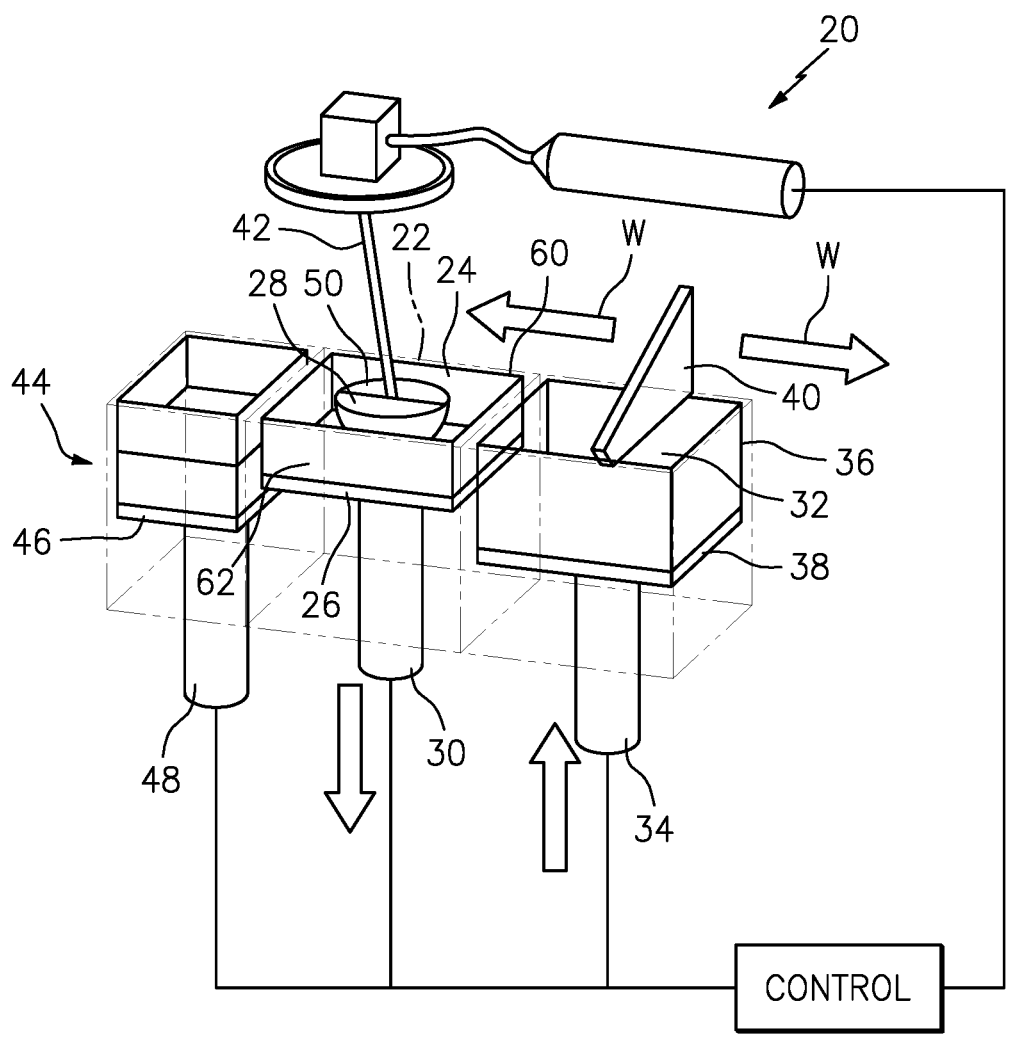
FIG. 1 is a schematic cross section of a Laser Powder Bed Fusion system.

FIG. 1 schematically illustrates an additive manufacturing system 20 that may have particular applicability to an additive manufacturing process. Although a Laser Powder Bed Fusion system 20 is schematically illustrated it should be appreciated that other additive manufacturing processes that also utilize a recoater blade such as selective laser melting (SLM) will also benefit herefrom. The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The system 20 generally includes a chamber 22 that includes a process space 24 in which a build plate 26 upon which an additively manufactured component 28 is grown. This build plate 26 can be lowered by an actuator 30, so that the component 28 can be produced in the process space 24.

A stock of powder 32 is located in a powder dispenser 36 atop a dispenser plate 38 that can be raised by an actuator 34. The additively manufactured component 28 is grown on the build plate 26 as a recoater blade 40 sweeps across the surface thereof in a linear recoat direction as indicated by arrow W. The recoater blade 40 is moved over the stock of powder 32 in the dispenser 36, with the result that, after the lowering of the build plate 26, a further layer of powder is applied and leveled by the recoater blade 40 to form a layer of the component 28 by a laser beam 42. The recoater blade 40 then spreads excess powder 32 into a powder collector 44 atop a collector plate 46 that is correspondingly lowered by an actuator 48. The additively manufactured component 28 is grown on the build plate 26 and the recoater blade 40 sweeps across the surface thereof in a linear recoat direction as indicated by arrow W.

The chamber 22 includes a window 50 through which the laser beam 42 is directed. An inlet manifold 60 and an outlet manifold 62 communicate an inert process gas 70 such as argon or nitrogen through the process space 24 over the build plate 26. This inert process gas sweeps over the surface of the component 28 to minimize undesirable reactions of the melting bath of component material with gaseous constituents to discharge possible evaporation products of the component material through the outlet manifold 62. A feed gas may also be provided to facilitate formation of a layer with a composition different from that of the component material.

Figure 2:
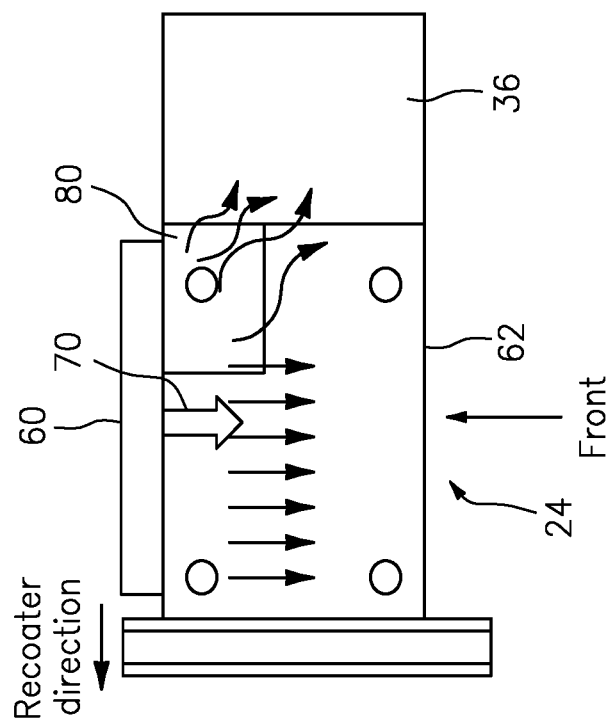
FIG. 2 is a top schematic view of a no-build zone in a back corner of a build plate of the system.

With reference to FIG. 2, turbulence in the gas flow from the inlet manifold 60 may result in a no-build zone 80 in the back corner of the build plate 26 adjacent to the inlet manifold 60 and the powder dispenser 36, making it impossible to build certain geometries.

Figure 4:
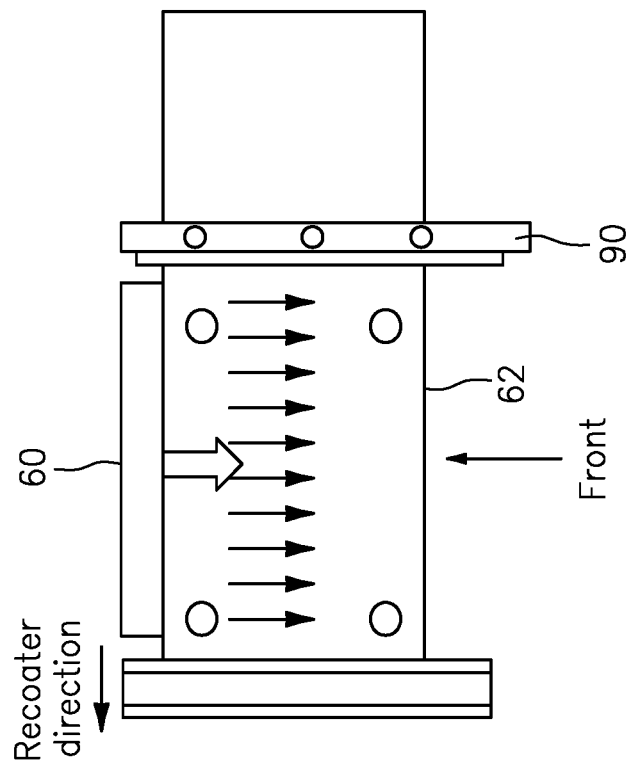
FIG. 4 is a top view of a build plate of the system with a gas shield according to one disclosed non-limiting embodiment.
Figure 3:
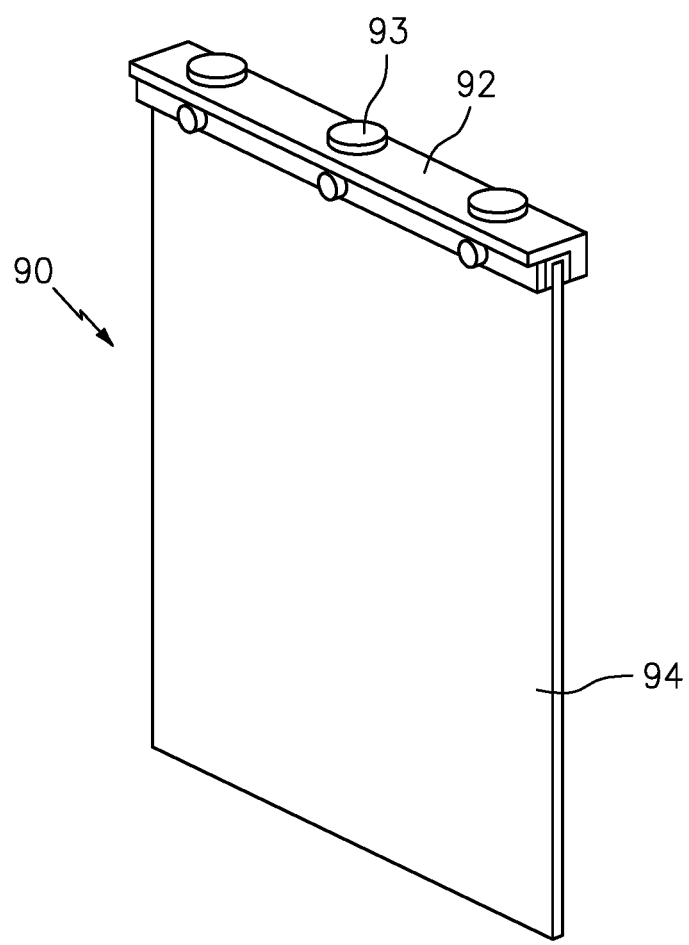
FIG. 3 is a perspective view of the gas shield according to one disclosed non-limiting embodiment.

With reference to FIG. 3, a gas shield 90 is selectively positioned adjacent to the build plate 26, the inlet manifold 60 and the powder dispenser 36 (FIG. 4). The gas shield 90 includes a mounting bracket 92 and a flexible non-outgassing polymer curtain 94. In one embodiment, the mounting bracket 92 may include attachments 93 (e.g., magnets) which permit the gas shield 90 to be removably attached within the chamber 22. The curtain 94 is flexible to permit the recoater blade 40 to pass under during recoat action. In another embodiment, the gas shield 90A may be automatically moved in response to the movement of the recoater blade 40 during recoat action.

The gas shield 90 segregates the process space 24 from the powder dispenser 36 to minimize the turbulence in the gas flow from the inlet manifold 60. That is, the gas shield 90 blocks the gas from entering the powder dispenser 36 which causes the turbulence. Clean, laminar gas flow facilitates removal of excessive condensate during the build process.

Figure 5:
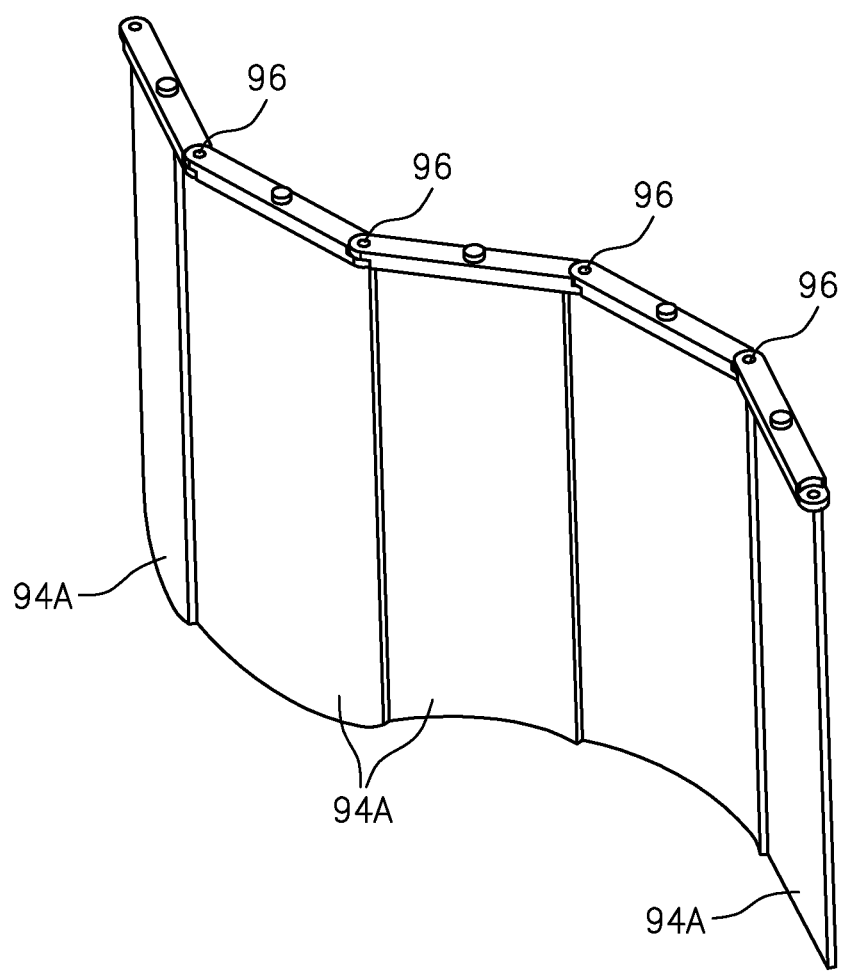
FIG. 5 is a perspective view of another gas shield according to one disclosed non-limiting embodiment.
Figure 6:
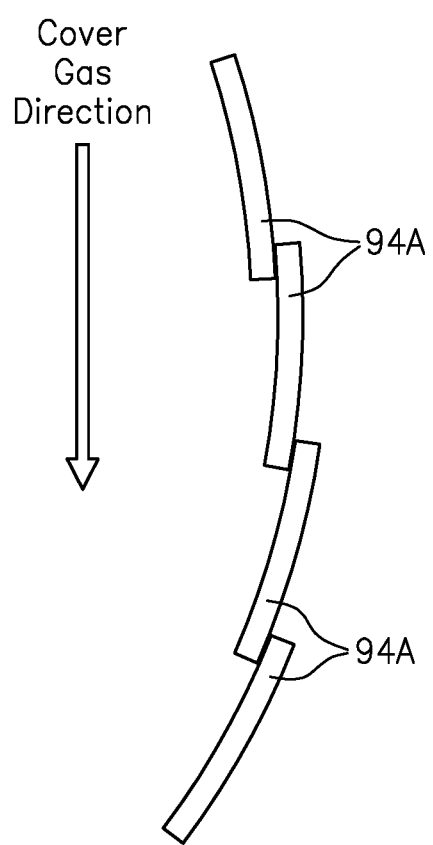
FIG. 6 is an enlarged view of the gas shield of FIG. 5 illustrating an arrangement of the gas shield with respect to a gas flow.

With reference to FIG. 5, in another embodiment, the curtain 94 may be formed of a multiple of overlapping slats 94A (FIG. 5). The overlapping slats 94A may be overlapped with respect to the direction of the flow to facilitate flow to minimize the turbulence in the gas flow from the inlet manifold 60 (FIG. 6).

In another embodiment, the gas shield 90A may include a flexible mounting bracket 92 with a multiple of articulating joints 96 (e.g., chain links), to form a non-linear shield within the process space 24. That is, the curtain 94 forms a non-linear barrier that facilitates concentration and direction of the gas.

The shield segregates and directs the cover gas flow which directly affects build quality. The shield also increases the usable area on the build plate and significantly reduces the possibility of a build crash.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. An additive manufacturing system, comprising:
   a chamber having a build plate;
   a powder dispenser adjacent to the chamber; and
   a flexible gas shield located adjacent to the build plate to at least partially segregate the powder dispenser and the chamber;
   a recoater blade moveable between the powder dispenser and the chamber, wherein the recoater blade flexes the flexible gas shield while moving between the powder dispenser and the chamber.

2. The system as recited in claim 1, wherein the gas shield is magnetically attached adjacent to the chamber.

3. The system as recited in claim 1, wherein the gas shield is selectively positioned adjacent to the build plate, an inlet manifold and the powder dispenser.

4. The system as recited in claim 1, wherein the gas shield comprises a mounting bracket and a flexible non-outgassing polymer curtain.

5. The system as recited in claim 4, wherein the mounting bracket comprises attachments for the flexible non-outgassing polymer curtain.

6. The system as recited in claim 4, wherein the mounting bracket comprises magnets for the flexible non-outgassing polymer curtain which permit the gas shield to be removably attached to a component of the system with the flexible non-outgas sing polymer curtain in position between the powder dispenser and the chamber.

7. The system as recited in claim 1, wherein an additively manufactured component is grown on the build plate and the recoater blade sweeps across the surface thereof in a linear recoat direction.

* * * * *